Nov. 11, 1958 J. E. GLENN ET AL 2,859,927
AILERON CONTROL SYSTEM
Filed July 6, 1954 2 Sheets-Sheet 2

INVENTORS:
John E. Glenn
Herbert L. Hubbard
By Hubert E. Metcalf
Their Patent Attorneys

United States Patent Office 2,859,927
Patented Nov. 11, 1958

2,859,927

AILERON CONTROL SYSTEM

John E. Glenn, Hawthorne, and Herbert L. Hubbard, Inglewood, Calif., assignors to Northrop Aircraft, Inc., Hawthorne, Calif., a corporation of California Application July 6, 1954, Serial No. 441,341

4 Claims. (Cl. 244—90)

The present invention relates to airplane construction and more particularly to a novel construction and coaction between a trailing edge aileron and a wing tip aileron.

Normally conventional trailing edge ailerons provide ample control surfaces to maintain lateral stability of an airplane. This, however, is not always the case in connection with high speed airplanes necessarily having small wings and consequently small lateral control surfaces. Briefly the instant invention discloses a wing assembly including a trailing edge aileron and a wing tip aileron. The trailing edge and wing tip ailerons being interconnected in such manner that the latter functions under certain predetermined conditions to materially increasing the total effective area of the lateral control surfaces. The present invention utilizes a surface changer responsive to either a "q" or a Mach switch whereby the tip aileron responds to movements of the pilot's lateral control elements under the aforementioned predetermined conditions and is rendered non-responsive under other conditions.

Accordingly it is an object of the instant invention to provide a wing assembly having a trailing edge aileron and a wing tip aileron in which the latter responds or fails to respond to movements of a pilot's control element in accordance with certain predetermined conditions to which the wing assembly may be subjected. The above predetermined conditions being sensed by a "q" or a Mach switch.

The term "q switch" as used throughout the specification and appended claims refers to a switch mechanism responsive to a predetermined dynamic air pressure acting thereon causing the mechanism to open or close an electrical circuit.

The term "Mach switch" as used throughout the specification and appended claims refers to a switch mechanism mounted on an aircraft functioning to open an electrical circuit at such times as the aircraft on which the mechanism is mounted decelerates from a speed in excess of a predetermined speed to a speed less than said predetermined speed and vice versa.

The above and other objects will become more apparent from the following description and drawings in which like reference characters denote like parts. It is to be expressly understood, however, that the drawings are for the purpose of illustration only and not a definition of the limit of the invention, reference being had for this purpose to the appended claims.

In the drawings:

Figure 4 is a schematic diagram showing the electrical circuit for actuating the surface changer of the instant invention.

Figure 1:
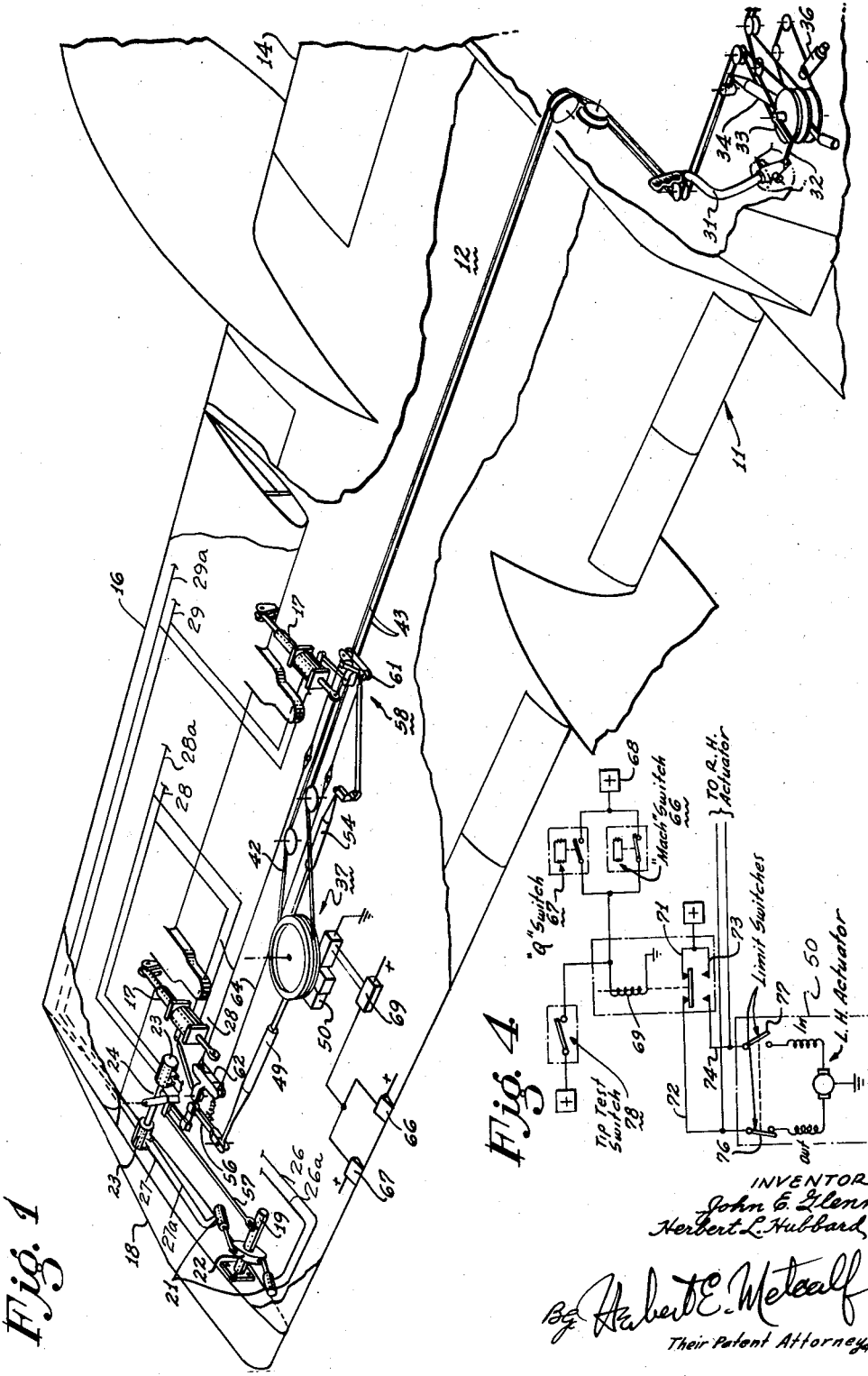
Figure 1 is a fragmentary perspective view of an airplane incorporating the instant invention.

Referring to the drawings for a detailed description of a preferred embodiment of the instant invention, Figure 1 shows portions of an airplane 11 having a laterally extending wing 12. Only one wing is shown, however, it is to be understood that the following description also applies to a similar wing extending from the left side of the plane. A conventional flap 14 and aileron 16 are mounted on the trailing edge of the wing 12. The aileron is mounted for pivotal movement and is moved throughout its operating range by a pair of hydraulic servos 17 mounted adjacent each end of the aileron. These servos are of conventional integral construction and rigged in a well known manner whereby the valve elements, controlling the flow of fluid to each servo, are automatically returned to their neutral position in response to aileron movement.

Mounted at the extreme outboard end of the wing 12 is a wing tip aileron 18 having the same general airfoil configuration as the wing at its outboard end. The wing tip aileron is mounted for angular movement on a shaft 19 having an axis coinciding, at least in part, with the elastic axis of the wing. In the present embodiment the wing tip aileron functions to augment the effect of the lateral control surface 16 under certain conditions in a manner presently explained. The shaft 19 is mounted in bearings supported by cord members of the wing 12. A pair of hydraulic actuators 21 impart angular movement to the shaft 19 and aileron 18 acting through a collar 22 fixedly secured to the shaft. Flow of fluid to the actuators 21 is controlled by a pair of valves 23. The valve spools of these valves are moved from and returned to their neutral positions by means of a scissor-type mechanism 24. Fluid communication between the valves 23 and actuators 21 is provided by hydraulic lines 26, 26a, 27 and 27a.

In the instant embodiment dual hydraulic systems are provided to supply fluid to the servos 17 and actuators 21. In this respect the outboard servo 17 and the forward actuator 21 are served by one set of hydraulic lines 28 and 28a while the inboard servo 17 and aft actuator 21 are served by the lines 29 and 29a. This provides a safety factor insuring the continued operation of one of the servos 17 even though one set of hydraulic lines may become damaged.

Mounted in the fuselage of the plane 11 is a pilot's control element 31 connected by suitable linkage 32 to an aileron actuating mechanism 33. Lateral movement of the control element 31 results in angular movement of certain cable pulleys of the mechanism 33. Also operationally connected to the mechanism 33 is a conventional aileron trim and force producer 34 and aileron servo 36 responsive to an automatic pilot (not shown). Inasmuch as the force producer 34 and servo 36 do not constitute essential parts of the present invention a further description of these members is not deemed necessary.

Figure 2:
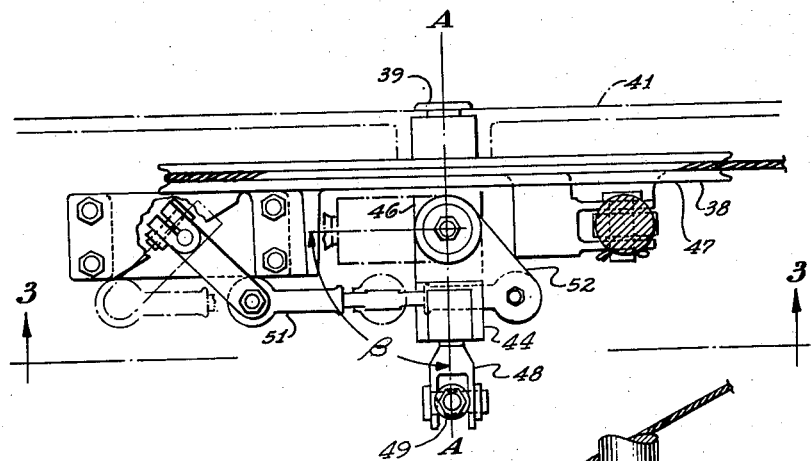
Figure 2 is a side view of the surface changer utilized in the instant invention.
Figure 3:
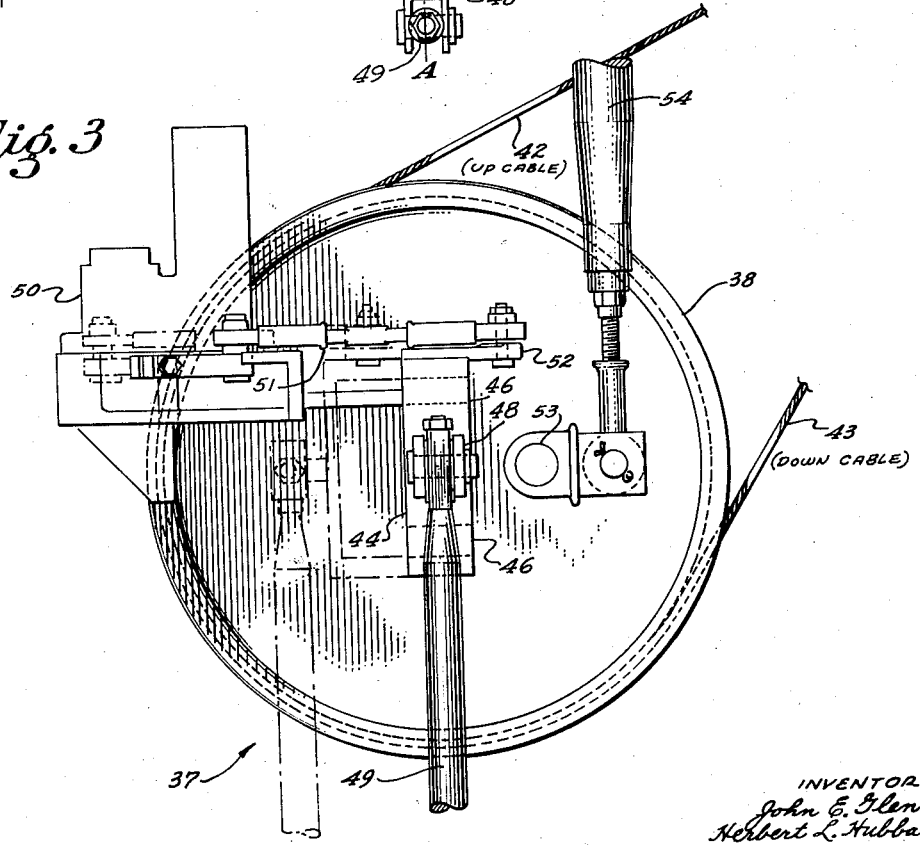
Figure 3 is a view of the surface changer as viewed from the line 3—3 of Figure 2.

Located in and mounted on structural members of the wing 12 is a surface changer mechanism 37 as best seen in Figures 2 and 3. This mechanism consists of a cable pulley 38 mounted on a supporting stub shaft 39 for angular movement about a vertical axis A—A, the stub shaft is in turn supported by a member 41 extending chordwise of the wing 12. Movements of the mechanism 33 are transmitted to the pulley 38 through aileron up and down cables 42 and 43, respectively. The arm portions of a U-shaped member 44 are pivotally attached to a pair of projections 46 extending in a normal direction from the face 47 of the pulley 38. The projections 46 extend from the face 47 at diametrically opposite positions with respect to the axis A—A. Mounted on the member 44 is a clevis 48 adapted to receive one end of a tip aileron load relief rod 49. The clevis 48 is pivotally mounted on the member 44 so that the axes A—A of the shaft 39 and clevis 48 coincide at such times as the axis of the latter is normal to the plane of rotation of the pulley 38. This position of the member 44 and clevis 48 is shown by solid line construction in Figure 2 and is referred to as the centered or null position of these two elements for reasons which will be apparent presently. The relative position of the pulley 38, as shown in Figure 2 in which the common pivotal axes of the member 44 and projections 46 and the longitudinal axis of the rod 49 lie in a common plane, is referred to as the pulley's neutral position. At such times as the pulley 38 is in its neutral position the aileron 16 is in its normal position, that is it is neither raised or lowered.

The member 44 and clevis 48 may be angularly moved from their null position through a predetermined angle β to a non-centered position as shown by broken line construction in Figure 2. To accomplish this angular movement of the clevis and member 44 a bidirectional electric motor 50 is provided which is secured to and rotates with the pulley 38. The output shaft of the motor 59 imparts pivotal movement to the clevis and member 44 through a link 51 and an arm 52, the latter being constructed integral with the member 44. Also extending from the face 47 of the pulley 38 is a stub shaft 53 radially spaced from the shaft 39 and adapted to receive one end of an aileron load relief rod 54.

Suitable conventional linkages and cables are provided for imparting angular movement of the surface changer 37 to the valves 23 and the valves of the servos 17. A linkage and bell crank assembly 56 transmits movements of the rod 49 to the scissor mechanism 24 to effect movement of the valve spools of the valves 23 from their neutral positions. The valve spools of the valves 23 are returned to their neutral positions in response to angular movement of the aileron 18 acting through a follow-up rod 57 and the mechanism 24. A linkage assembly 58, including a bell crank having a cross member 61, transmits movements of the rod 54 to the valve spool of the inboard servo 17 to effect its movement from neutral. Movements of the cross member 61 are transmitted to a bell crank assembly 62 by means of interconnecting cables 63 and 64. The assembly 62 is located adjacent the outboard servo 17 and functions to move the valve spool of the latter servo from neutral. The piston rods of the servos 17 are connected to fixed structure while the piston housings are connected to the aileron 16 whereby the valve spools are returned to neutral in response to movement of the aileron 16.

The motor 50 is responsive to a "q" switch and a Mach switch whereby the motor is energized under certain conditions to move the member 44 and clevis 48 between their null and non-centered positions. It should be apparent, however, that with the clevis 48 in its centered position angular movements of the pulley 38 are not transmitted to the rod 49 and the system will operate substantially as a conventional aileron system.

Referring now to Figure 4 the electrical circuit and aforementioned "q" and Mach switches regulating the flow of electric current to the motor 50 is diagrammatically shown. As stated before the tip aileron 18 augments the effect of the aileron 16 but only at high speeds. At low speeds the clevis 48 is located at its null position accordingly no movement is imparted to the tip aileron. At such times as the plane 11 attains a speed of approximately eighty-five hundredths Mach (.85 M) or a speed subjecting the wing to a dynamic pressure of approximately eight hundred pounds per square foot (800 p. s. f.) a Mach switch 66 or a "q" switch 67 is closed thereby completing a circuit which energizes the motor 50 which in turn moves the member 44 and clevis 48 to their non-neutral positions. The switches 66 and 67 are connected in parallel in an electric circuit containing a power source 68 and a solenoid 69. The solenoid in its energized position acts to close a circuit acting through connections 71 and 72 thereby energizing the motor 50 to operate in one direction. In the non-energized position the solenoid functions to complete a circuit acting through connectors 73 and 74 thereby energizing the motor to operate in the opposite direction. Limit switches 76 and 77 are provided in the motor 50 and actuated thereby. These limit switches are linked together so that the closing of one results in the opening of the other.

In Figure 4 the Mach switch 66 is shown in its closed position thus energizing the solenoid 69. Accordingly the circuit acting through connectors 71 and 72 is completed thereby energizing the motor 50 which in turn effects movement of the clevis 48 to its non-neutral position. Upon a predetermined number of revolutions of the motor 50, sufficient to move the clevis 48 from its null to its non-centered position, the flow of current to the motor is interrupted by the switch 76 opening. Simultaneously as the switch 76 opens switch 77 is closed whereby the circuit through connectors 73 and 74 will be completed at such time the speed of the plane is sufficiently reduced to open the Mach switch and de-energize the solenoid 69. The foregoing assumes the "q" switch has not moved to its closed position in the meantime. Assuming the above conditions have been met the clevis 48 has now been returned to its null position and the system is ready to repeat the cycle. A momentary tip test switch 78 is provided to enable the tip aileron system to be checked out before take-off.

The component parts of the instant invention having been described a more complete understanding of its novel features and advantages will be forthcoming from the following description of its operation.

During normal operations of the plane 11, that is at such times as the plane is traveling at speeds less than .85 M. or at a speed and under conditions subjecting the wing 12 to a dynamic pressure of less than 800 p. s. f., the surface changer 37 functions as a conventional cable quadrant. Under the above conditions the clevis 48 will be in its null position and only the trailing edge ailerons will be responsive to lateral movements of the pilot's control element 31.

During plane speeds exceeding .85 M. or at speeds and conditions subjecting the wing to a dynamic pressure exceeding 800 p. s. f. the Mach or the "q" switch will have closed thereby energizing the motor 50 and moving the clevis 48 to its non-centered position. With the clevis thus removed from its null position lateral movements of the pilot's control element 31 will be transmitted to the tip aileron as well as the trailing edge aileron. Should the trailing edge ailerons be in their normal positions, and the pulley 38 in its neutral position, at such times as either the "q" or Mach switch closes no movement will be imparted to the tip aileron. However, should the trailing edge ailerons be in a non-normal position at such times as either the "q" or Mach switch closes it will be apparent the tip aileron will be caused to assume a position in which it augments the effect of its adjacent trailing edge aileron. If either the "q" or Mach switch has been closed and is subsequently opened, at such times as the quadrant 38 is displaced from neutral and consequently the aileron 16 from its normal position, the motor 49 will be energized in a direction to return the clevis 48 to its null position and the tip aileron to its normal position.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an airplane having a movable pilot's control element, the combination comprising: a wing assembly having a trailing edge aileron and a wing tip aileron each pivotally mounted on said wing assembly for angular movement through respective ranges; a cable pulley pivotally mounted on said assembly; cable means connected to impart angular movement to said pulley in response to movements of said control element; first linkage means eccentrically mounted on said pulley with respect to the axis thereof and attached to said trailing edge aileron for imparting pivotal movement to the latter; second linkage means having one end thereof pivotally mounted on said pulley and extending therebetween and said wing tip aileron for imparting pivotal movement to the latter; said second linkage means having a centered and a plurality of non-centered positions in which the pivotal axis of said one end of said second linkage means respectively coincides with and is positioned eccentrically with respect to the pivotal axis of said pulley; and means for moving said second linkage means between said centered and non-centered positions.

2. Apparatus as set forth in claim 1: further characterized in that said second linkage means includes a U-shaped member pivotally mounted on said pulley and a clevis member having a cylindrical shank portion the latter being pivotally mounted on said U-shaped member so that the axis of said pulley and cylindrical shank portion coincide at such times as said second linkage means is in said centered position and having an angular relationship at such times as said second linkage means is moved to any one of said non-centered positions.

3. Apparatus as set forth in claim 1: further characterized in that the means for moving said second linkage means between said centered and non-centered positions includes a reversible type electrical motor, an electrical circuit connected to energize said motor, and a "$q$" switch mounted on said assembly adapted to reverse the flow of current through said circuit at such times as the dynamic air pressure acting on said switch alternates between pressures which are greater and smaller than a predetermined dynamic air pressure.

4. Apparatus as set forth in claim 1: further characterized in that the means for moving said second linkage means between said centered and non-centered positions includes a reversible type electrical motor, an electrical circuit means connected to energize said motor, and a Mach switch mounted on said assembly adapted to reverse the flow of current through said circuit at such times as said switch and assembly alternates between speeds which are greater and less than a predetermined speed.

References Cited in the file of this patent
UNITED STATES PATENTS

| | | |
|---|---|---|
| 2,205,610 | Van Nes | June 25, 1940 |
| 2,420,932 | Cornelius | May 20, 1947 |
| 2,497,431 | Beman | Feb. 14, 1950 |
| 2,512,790 | Cleveland | June 27, 1950 |
| 2,665,085 | Crocombe et al. | Jan. 5, 1954 |